US007654457B2

(12) United States Patent
Wilson et al.

(10) Patent No.: US 7,654,457 B2
(45) Date of Patent: Feb. 2, 2010

(54) VOTING MACHINE STORAGE AND TRANSPORT CART WITH IMPROVED SECURITY

(76) Inventors: Joseph Wilson, 206 Vallis Dr., Spence, WV (US) 25276; Gary V. Abel, 3882 Whitebrook La., Ellicott City, MD (US) 21042

( * ) Notice: Subject to any disclaimer, the term of this patent is extended or adjusted under 35 U.S.C. 154(b) by 189 days.

(21) Appl. No.: 11/899,333

(22) Filed: Sep. 5, 2007

(65) Prior Publication Data

US 2008/0116270 A1 May 22, 2008

Related U.S. Application Data

(60) Provisional application No. 60/856,701, filed on Nov. 22, 2006.

(51) Int. Cl.
*G06K 17/00* (2006.01)
*G07C 13/00* (2006.01)

(52) U.S. Cl. ........................ 235/386; 235/52; 235/54 E; 705/12

(58) Field of Classification Search ................. 235/386, 235/52, 54 E; 232/2; 705/12; 434/306
See application file for complete search history.

(56) References Cited

U.S. PATENT DOCUMENTS

| | | | | |
|---|---|---|---|---|
| 5,348,324 | A * | 9/1994 | Trotta | 280/35 |
| 5,666,765 | A * | 9/1997 | Sarner et al. | 52/36.1 |
| 5,673,984 | A * | 10/1997 | Insalaco et al. | 312/264 |
| 6,264,219 | B1 * | 7/2001 | Smith | 280/79.11 |
| 6,669,214 | B1 * | 12/2003 | Domis | 280/47.35 |
| 2002/0106620 | A1 * | 8/2002 | Barnum | 434/306 |
| 2005/0140106 | A1 * | 6/2005 | Huguet | 280/79.3 |

* cited by examiner

*Primary Examiner*—Thien M. Le
*Assistant Examiner*—Tuyen K Vo
(74) *Attorney, Agent, or Firm*—Ober, Kaler, Grimes and Shriver; Royal W. Craig

(57) ABSTRACT

A voter cart capable of supporting a voting terminal, optical scan ballot counter and ballot box, and multiple (collapsible) voting booths in a portable, fully usable and secure configuration. The cart is generally formed with a pair of opposing side-rails joined together in a spaced-apart configuration and mounted on castors, and a plurality of reinforcing struts between and amongst the side rails. The touch-screen voting terminal is seated atop a sliding shelf mounted on roller-brackets between the side-rails and extensible from one end thereof at waist-level for easy wheelchair and/or any other voter access thereto. All the loaded equipment is fully restrained against lateral and vertical motion, and yet all equipment is given full access to their control panels, doors, etc. Moreover, the particular design maximizes strength and usability, and yet keeps weight to a minimum with a framework that is as light weight as possible.

20 Claims, 9 Drawing Sheets

VOTING MACHINE STORAGE AND TRANSPORT CART WITH IMPROVED SECURITY

CROSS-REFERENCE TO RELATED APPLICATION(S)

The present application derives priority from U.S. Provisional application Ser. No. 60/856,701 filed 22 Nov. 2006.

BACKGROUND a. Field of Invention

The invention relates to accessories for voting devices and, more particularly, to a specially-adapted utility cart for storage and/or transport and/or use of voting devices in a more convenient and secure manner.

b. Background of the Invention

There are a myriad of existing storage and transport carts currently in use for a wide variety of different applications. Some of these carts are adapted for carrying high-value electronic equipment, and others carry confidential high-security items. Utility carts for voting devices must combine both sets of attributes inasmuch as voting devices are high-value devices and require considerable security precautions. Moreover, voting devices are extremely heavy, requiring a very robust utility cart, and they must be thoroughly accessible by persons, inclusive of physically disabled persons, from outside the cart.

Most polling precincts in the United States utilize voting booths with specialized balloting terminals. In the past many precincts used terminals such as Datavote™ or Votomatic™, which required the voter to punch out a perforated rectangle (i.e., a chad) from a card using a stylus. There is a mask installed in the Votomatic, which reveals certain holes that are aligned with ballot book pages in the recorder, which in turn correspond to names of candidates or issues. The punched card was then taken and inserted into a precinct ballot counter, which is programmed to translate the hole and number to the particular candidate or issue.

Paper balloting can be hard for mobility impaired, vision impaired or non-English speakers to use. Consequently, electronic balloting terminals are gaining popularity and at least one or two are made available in each voting precinct. Indeed, the Help American Vote Act (HAVA) of 2002 has mandated that, beginning in 2006, each polling place have at least one voting machine that is fully accessible for persons with disabilities. Currently, "direct recording electronic voting machines" (DREs) are the only machines at present that can fulfill this accessibility requirement. DREs typically entail a touch-screen ballot-marking machine with audio capability (usually via attached headphones). A DRE voting machine records votes, processes the data, and then records voting data and ballot images in memory. After the election it produces a tabulation of the voting data stored in a removable memory component and as printed copy.

There are many manufacturers of DREs including Diebold Election Systems, ES&S, Sequoia Voting Systems, Hart Intercivic, etc. For example, the AutoMARK™ voter assist terminal by AutoMARK Technical Services (ATS) is a ballot-marking terminal sized at approximately 2'×2'×1.5') and features a fold-out 15" full-color touch-screen display. Voters securely cast their vote for each race and/or ballot proposition simply through the touch of the screen or by way of audio guidance. When the voter inserts the ballot into the AutoMARK, an electronic version of the ballot appears on the screen and can be read electronically to the voter. Upon the voter's direction, the AutoMARK marks the ovals on the optical scan ballot.

Whether using a DRE or any other optical scan voting terminal the voter is provided with a completed paper ballot and the voter (or official) then inserts this ballot into an optical scan ballot counter for tabulation, after which the paper ballot is deposited into a sealed ballot box. Again, there are many manufacturers of ballot counters. For example, the ES&S Model M100 is an easy-to-use, high-speed central paper ballot counter and vote tabulator that processes at a speed of over 300 ballots per minute. The ES&S Model M100 Ballot Counter is approximately the size of a large computer server (approximately 2.5'×2'×4.5'). Diebold also sells its AccuVote-OS™, an optical scan voting tabulator that measures 14"×16"×3" and weighs 13.7 pounds, and Sequoia™ manufactures its Insight Optical Ballot Reader of comparable size.

Voting precincts typically employ six to twelve voting booths, each with a balloting terminal (paper or electronic), optical scan voting tabulator, and ballot box. It is not an easy task for precinct workers to deliver, move in, set up, monitor, remove and return to storage this much voting equipment. Most precincts now either manually carry and transport the equipment on multiple trips or use standard utility carts similar to those which carry folding chairs. These generic utility carts normally comprise a simple platform mounted on wheels or casters to provide mobility. These carts may be provided with upwardly protruding side-rails to constrain the equipment. Such carts take no security precautions, and do not facilitate on-board access to the equipment. For voting devices one of the main functions of the cart is necessarily to provide a secure environment to prevent theft or tampering of the items stored within the cart. Nevertheless, the equipment for each voting booth (one ballot-marking/printing system together with optical scan ballot tabulator, and ballot box) is loaded onto the utility cart which is then wheeled into position (proximate the voting terminals) for use. Since the equipment is not accessible while on the cart, it must be off-loaded and the cart removed for voting. After voting the process is reversed.

It would be much more convenient to devise a utility cart that houses the voting equipment in a fully operable and accessible position, the ballot-marking terminal being approximately waist-level for easy access by standing or wheelchair voters, and the optical scan voting tabulator (which is much larger and heavier) positioned proximate the voting terminal and overtop the ballot box. To properly mount all three devices on a utility cart requires a multi-compartmentalized cart with robust mechanical restraints to protect against shifting of the equipment, robust security features to protect against theft and/or tampering with the equipment, and yet full frontal and side access to both pieces of equipment to allow access to and control of their consoles.

SUMMARY OF THE INVENTION

It is, therefore, an object of the present invention to provide a storage and transport cart specifically adapted for voting devices and which incorporates multiple compartments for each piece of voting equipment, and specifically one compartment with slide-out tray for a touch-screen voting terminal such as the AutoMARK, and one compartment for an optical scan voting tabulator such as the ES&S Model M100, the Diebold AccuVote-OS, or Sequoia Insight, the voting tabulator being seated atop a ballot collection box, as well as other compartments for other equipment and accessories.

It is another object to provide a voting cart with robust mechanical restraints to protect against shifting of the equipment, robust security features to protect against theft and/or tampering with the equipment, and yet full frontal and side access to both pieces of equipment to allow access to and control of their consoles.

It is another object to provide a voting cart that is light in weight and as inexpensive to manufacture as possible (weight is important because the lighter the weight, the higher degree of mobility, and so it is desirable that the framework be as light weight as possible without sacrificing stability and security).

It is another object to provide a storage and transport cart as above that situates the touch-screen voting terminal face-forward on a waist-level slide-out shelf for easy deployment of its touch-screen voting terminal and wheelchair voter access thereto, and to provide added security and protection to the touch-screen voting terminal when in a retracted position.

It is another object to provide a storage and transport cart as above that affords complete privacy to a voter when using the touch-screen voting terminal deployed on the slide-out shelf.

It is another object to provide a storage and transport cart as above that affords complete access to the electronic access panel of the touch-screen voting terminal when the unit is in the stowed or stored position.

It is another object to provide a storage and transport cart as above that includes full lateral restraints for all equipment carried thereon as well as a removable restraint for the slide-out voting terminal, and yet still allows full frontal and side access to the control panels of the various pieces of equipment.

It is another object to provide a storage and transport cart as above that provides additional storage and transport for other accessory items required for voter precincts. Examples of required items are extension cords, and handicap accessory kits (signs, door stops, specialty door knob, specialty pencils, magnifiers, and forms)

According to the present invention, the above-described and other objects are accomplished by providing a specially-adapted utility cart for storage and/or transport of voting devices in a more convenient and secure manner. The utility cart is capable of supporting a touch-screen voting terminal, separate optical scan voting tabulator and ballot box, multiple (collapsible) voting booths, and an area to store the accessory items required by the voter precinct. The touch-screen voting terminal is seated atop a sliding shelf, and the optical scan voting tabulator seated atop the ballot box are installed in a large compartment, the voting booths in their own compartment, and the accessory items in their own compartment (optionally a plastic, metal or corrugated tote box can be used to further combine and constrain these accessory items). These and other equipment may be wheeled into usable positions in the precinct, the voting booths removed and set up, all such equipment plugged into an optional on-board power strip, and the precinct is then ready for voting traffic. The touch-screen voting terminal is deployed face-forward at waist-level on the slide-out shelf for easy wheelchair and/or any other voter access thereto. The cart is generally formed with a pair of opposing side-rails defined by contiguous tubing bent in a closed rectangular loop with a full-height vertical reinforcing strut running from top to bottom of the loop. A plurality of lateral struts join the side-rails together. An optional rectangular deck may be secured atop the bottom-most struts and side-rails, but the open support of the side-rails will suffice. Four castors (with optional brake locks) are mounted beneath the bottom side rails, and the optional powerstrip is mounted on one of the lateral struts. The extensible shelf is mounted on roller-brackets between the side-rails and is extensible from one end thereof. In addition, a plurality of additional wires or bars interrupt the open rectangle of the side rails to restrain the on-board equipment. Also, optional securement belts are employed, one for holding the voting terminal onto the shelf, and a second securement belt removably attachable across the extensible shelf for securing the touch-screen terminal in the cart. All the loaded equipment is fully restrained against lateral motion, and yet all equipment is given full access to their control panels, doors, etc. Moreover, the particular design maximizes strength and usability, and yet keeps weight to a minimum with a framework that is as light weight as possible. In addition to the securement belt the sliding shelf is equipped with additional mechanical means of restraining and locking the shelf in either the stored or use (extended) position. This may be accomplished by use of easily accessible turn locks, thumb screws or other mechanical means.

BRIEF DESCRIPTION OF THE DRAWINGS

Additional aspects of the present invention will become evident upon reviewing the embodiments described in the specification and the claims taken in conjunction with the accompanying figures, wherein like numerals designate like elements, and wherein:

DETAILED DESCRIPTION OF THE PREFERRED EMBODIMENT

The present invention is a utility cart designed for storage and/or transport of a set of voting devices (inclusive of optical scan voting tabulator and ballot box, voting terminal, and portable voting booth) as well as sundry accessory components in a convenient, secure and readily accessible manner creating a portable and mobile voting booth for more convenient deployment in any voting precinct.

The utility cart 2 will be described by way of two exemplary embodiments, one adapted for bearing a Diebold Accu-Vote-OS™ optical scan voting tabulator together with an AutoMARK™ voter assist terminal, and the other adapted for bearing an ES&S Model M100 Ballot Counter and AutoMARK™ voter assist terminal, though the cart is equally suited for other brands of optical scan voting tabulators and touch-screen or punch card terminals.

Figure 1:
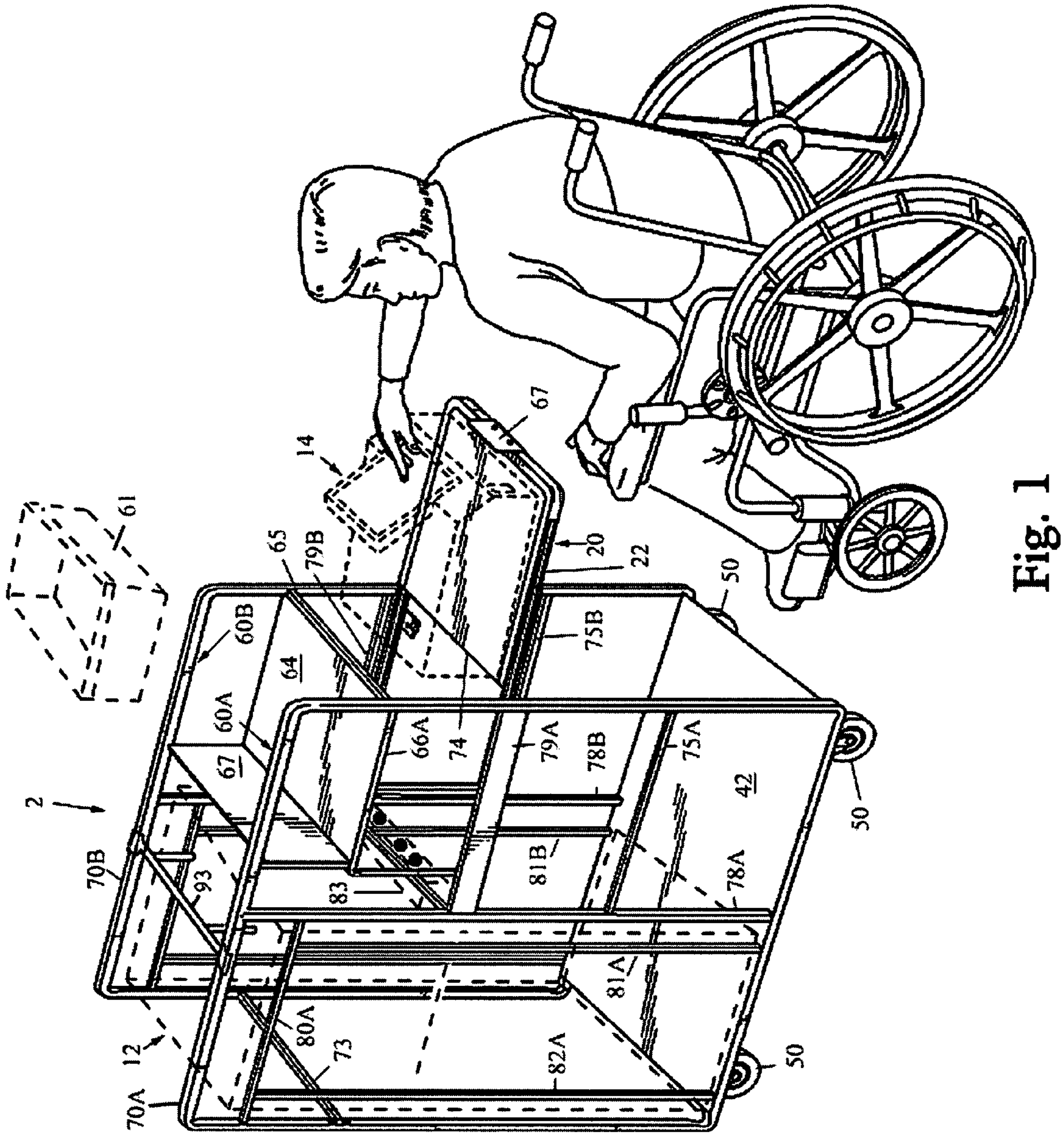
FIG. 1 illustrates the utility cart 2 according to a first embodiment and carrying optical scan voting tabulator 12 and touch-screen voter assist terminal 14 seated on slide out shelf 20 in a deployed (extended) position.

FIG. 1 illustrates the utility cart 2 according to the first embodiment and carrying the Optical scan voting tabulator 12 (here an ES&S Model M100 Ballot Counter and AutoMARK™ voter assist terminal in a fixed position, with voter assist terminal 14 (here an AutoMARK™ voter assist terminal likewise shown in dotted lines) seated on slide out shelf 20 in an extended position to deploy the touch-screen display.

Figure 2:
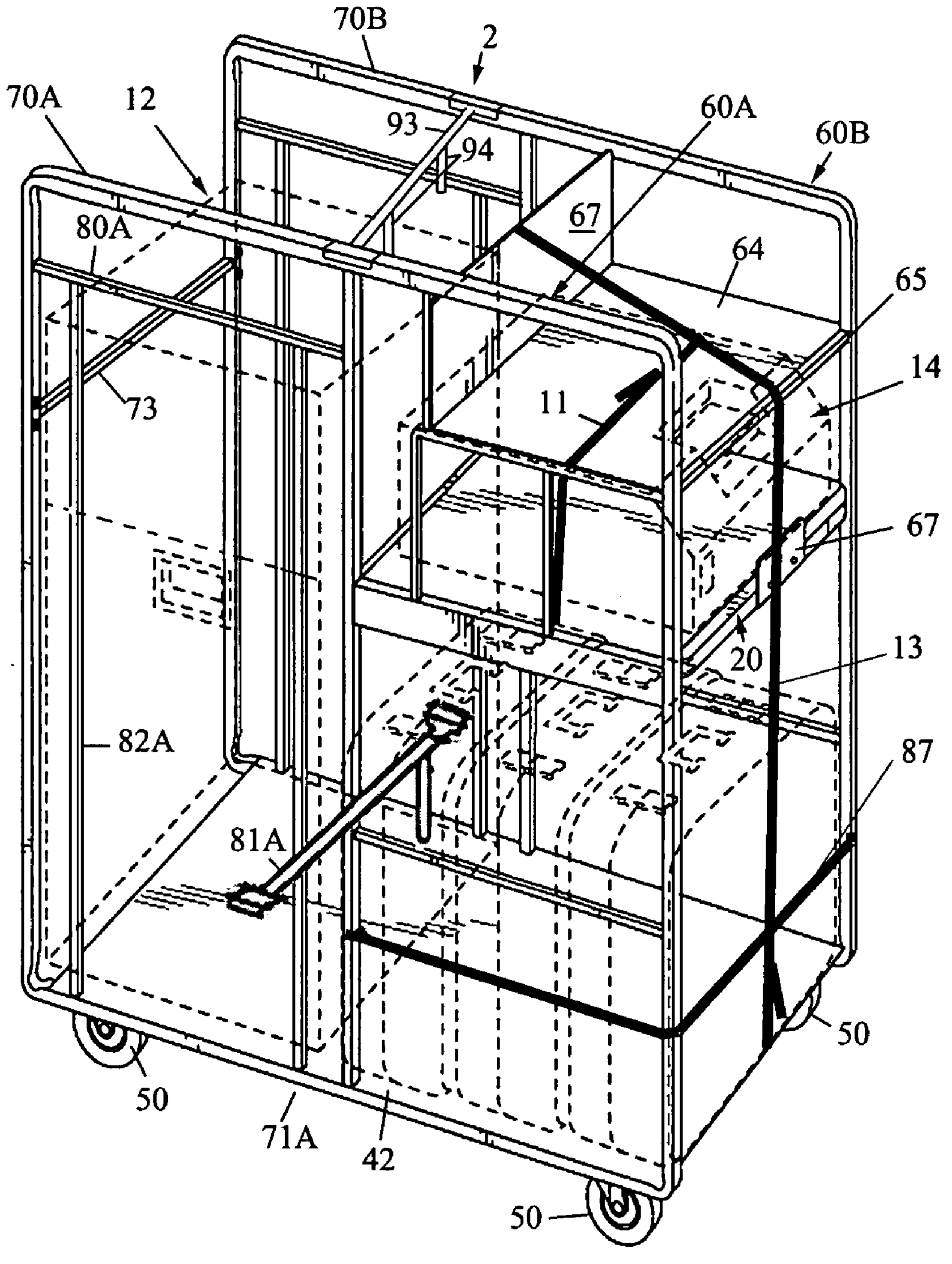
FIG. 2 is a top perspective view of the utility cart 2 as in FIG. 1 with touch-screen display of the voter assist terminal 14 folded and the slide out shelf 20 retracted to stow the voter assist terminal 14.

FIG. 2 is a top perspective view of the utility cart 2 as in FIG. 1 with touch-screen display of the voter assist terminal 14 folded and the slide out shelf 20 retracted to stow the voter assist terminal 14.

Figure 3:
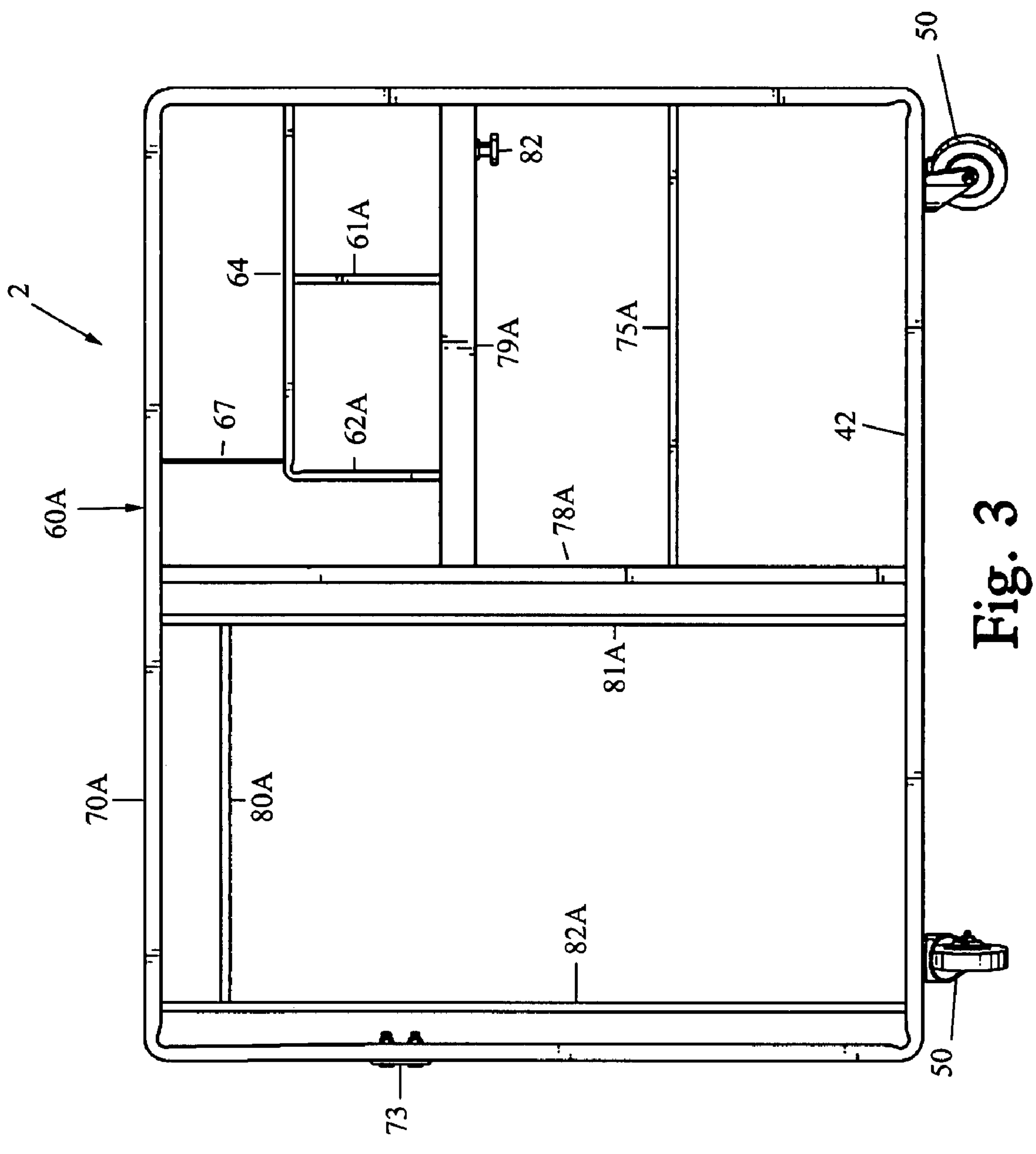
FIG. 3 is a left side perspective view of the utility cart 2 as in FIGS. 1-2.
Figure 4:
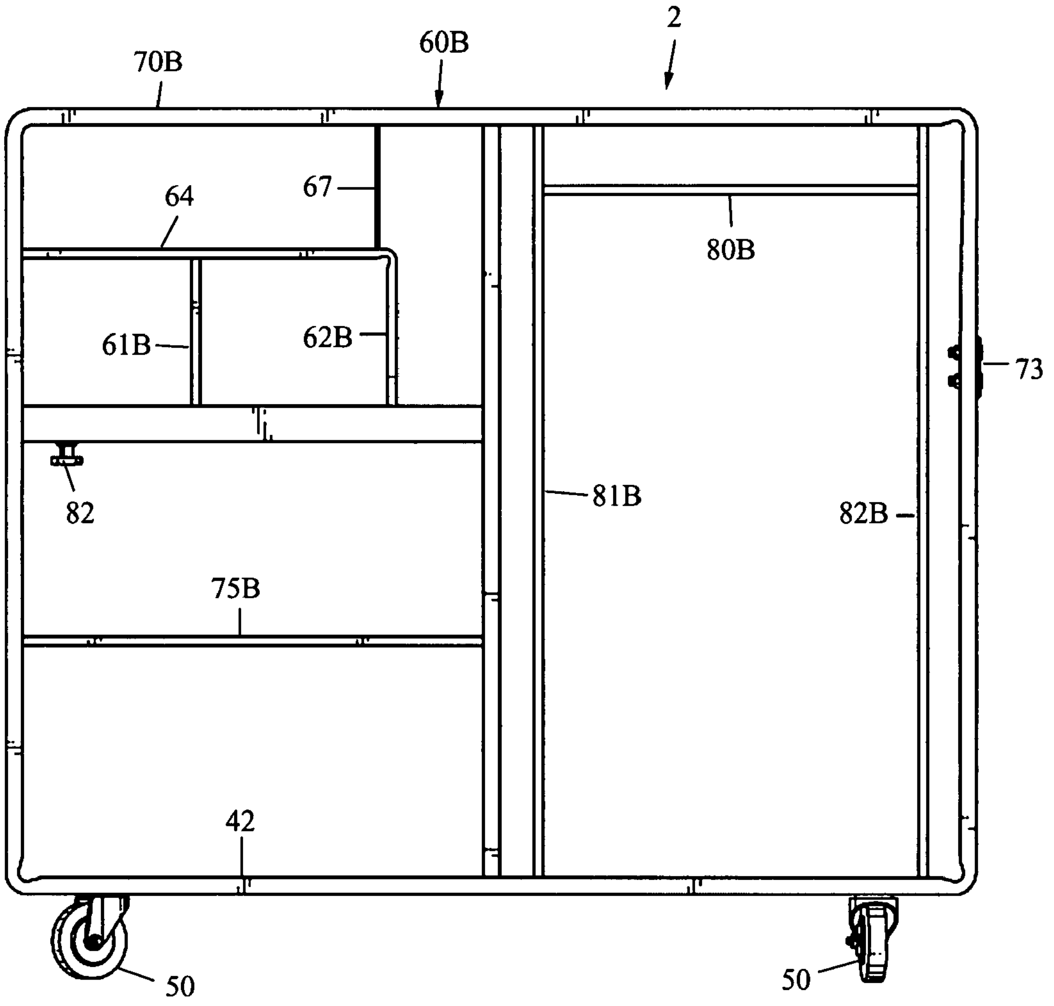
FIG. 4 is a right side perspective view of the utility cart 2 as in FIGS. 1-3.

FIG. 3 is a left side perspective view of the utility cart 2 as in FIGS. 1-2 which better illustrates the framework, and FIG. 4 is a right side perspective view. With collective reference to FIGS. 1-4, the cart 2 generally comprises a substantially rectangular tubular framework bounded by opposing rectangular side-rail assemblies 60A and 60B on either side. The side-rail assemblies 60A and 60B are each configured in a layed-over figure-eight. The side-rail assemblies 60A and 60B may, if desired, be bounded at the bottom by an optional lower platform 42, though a floorless support structure will also suffice. The side-rail assemblies 60A and 60B are bounded at the top by lateral center struts 70A, 70B, and at the bottom by lateral bottom struts 71A, 71B, all spanning the respective side-rail assemblies 60A, 60B. If included, the lower platform 42 is seated atop and is attached to the lateral bottom struts 71A, 71B.

The side-rail assemblies 60A and 60B are further reinforced by a combination of tie bars symmetrically configured on each side, plus a fixed horizontal shelf assembly 64, these features additionally providing protection for the voting equipment as well as tamper protection, yet still allowing open access thereto (as will be described). The tie bars include lateral tie bars 75A, 75B traversing one side of the respective side-rail assemblies 60A and 60B, and a bottom tie bar 76 joining the lateral bottom struts 71A, 71B of the two side-rail assemblies 60A and 60B together at their center points. The other side of the side-rail assembly 60A is reinforced by two vertical tie bars 81A, 82A running from the lateral bottom struts 71A, 71B up to a lateral tie bar 80A, and side-rail assembly 60B is likewise reinforced by two vertical tie bars 81B, 82B running from the lateral bottom struts 71A, 71B up to a lateral tie bar 80B.

The cart 2 is mounted atop four heavy duty castor wheels 50 that are secured beneath the lateral bottom struts 71A, 71B, and castors 50 may optionally be locking castors for portability. The cart 2 as a whole defines an interior space that is generally evenly divided into a front compartment and a rear compartment, bisected by the tie bar 76 joining the lateral bottom struts 71A, 71B of the two side-rail assemblies 60A and 60B. The rear compartment is a full-height compartment to accommodate the optical scan voting tabulator 12 seated atop a ballot box. The front compartment is subdivided into three vertically-stacked alcoves including a middle alcove for the voter assist terminal 14, lower alcove for porting one or more collapsible voting booths out onto the precinct floor, and upper alcove above the voter assist terminal 14 (and atop shelf assembly 64) for seating a tray to hold miscellaneous smaller items.

All of the framework for the above-described is preferably formed of powder-coated steel or aluminum tubing welded together, and the walls and panels formed of powder coated steel or aluminum paneling welded along the periphery to the framework. The major lengths of the side-rail assemblies 60A and 60B are preferably square steel or aluminum tubing, while all tie bars 75A, 75B, 76, 80A, 80B, 81A, 81B, 82A, 82B are round wire or square tubing.

The two side-rail assemblies 60A and 60B are identical for manufacturing economy and, with regard to side rail 60A each is subdivided/reinforced by a full-length vertical strut 78A running top to bottom between the upper length of side rail 60A and the lateral bottom strut 71A of the side-rail assembly 60A. Strut 78A is joined contiguously at the top to the other side rail 60A by the lateral strut 70. An optional power strip 83 (shown in dotted lines) is secured lengthwise along this lateral strut 70 for powering the on-board equipment.

The pull-out shelf assembly 20 is mounted on opposing struts 79A and 79B which traverse the side rails 60A, 60B midway up the full-length vertical struts 78A, 78B and are joined thereto. The pull-out shelf assembly 20 further comprises a set of conventional roller-brackets 22 mounted on the opposing struts 79A and 79B, and a retractable shelf 24 suspended between the roller brackets 22. The extensible shelf 24 preferably comprises a pressed steel shelf with peripheral reinforcement tubing. Thus, the extensible shelf 24 may be pulled directly out from the front of the cart 2 to fully expose the voter assist terminal 14 for access by voters, and to allow flip-up deployment of the touch-screen. Note that the present configuration positions the touch-screen at stomach level for convenient sitting access (such as by wheelchair voters) and standing patrons as well. A frontally mounted restraining plate 67 is attached to the front of slide out shelf 20 for frontwise restraint.

The horizontal shelf assembly 64 overhangs the extensible shelf 24 and is spaced therefrom to sit directly above the voter assist terminal 14. This shelf assembly 64 provides a storage surface and additionally provides security inasmuch as it prevents the voter assist terminal from being removed from the cart 2 when the extensible shelf 24 is secured in the retracted position, thereby protecting and enclosing it (when retracted). Shelf 64 is supported frontally by strut 65 and along the side-rails 60A, 60B by tie bars 66A, 66B, one on each side, each configured in a downwardly-turned F-configuration as shown and running down to the opposing struts 79A and 79B for support. The tie bars 66A, 66B offer lateral restraint and prevent the voter assist terminal 14 from falling out of the cart 2 sidelong, and also obstruct tampering with the device. The shelf assembly 64 is turned up toward the rear at vertical section 67 which is spaced from side rails 78A, 78B and from the pull out shelf 24 to provide clear sideward access to the voter assist terminal 14, and specifically to the rear electronic access panel, internal memory chips, and data ports behind the voter assist terminal 14 from either side of the cart 2, without removing the voter assist terminal 14 from cart 2. This makes retrieval of the memory chips and other electrical connections much easier.

As seen in FIG. 1 a plastic tote pan 61 may be seated on shelf assembly 64 to retain items placed therein.

In accordance with a key aspect of the present invention (referring to FIG. 2), an optional securement belt 13 is removably attachable across the frontside of the utility cart 2 for securing the extensible shelf 20 and the touch-screen voter assist terminal 14, as well as packed voting terminals inside the cart 2. The securement belt 13 comprises a length of braided Nylon webbing attached to the backside center of shelf 64 and selectively attachable (by locking clasp, buckle or otherwise) to the front center of the platform 42. This provides an extremely easy way to deploy the extensible shelf 24 for access by voters simply by untethering the belt 13, or to secure the voter assist terminal 14 and all other electronics or accessory equipment at the front compartments of cart 2 by securing the lower end of belt 13. In order to extend shelf 20 the securement belt 13 is detached and slide out shelf 20 extended and the touch-screen display of the voter assist terminal 14 deployed, all as seen in FIG. 1.

Another optional securement belt 11 is removably attached laterally across the extensible shelf 20 overtop the touch-screen voter assist terminal 14 to secure the terminal onto the shelf 20.

Also shown in FIG. 1 is optional retainer strap 87 for wrapping around the collapsible voting booths and securing them to side rails 78A, 78B.

FIG. 2 illustrates the front compartment with optical scan voting tabulator 12 seated therein atop the underlying ballot box, and additionally illustrates how the side and or rear doors of the optical scan voting tabulator 12 and/or ballot box can be accessed through the front compartment, directly through the two vertical struts 81A, 82A and lateral strut 80A. The front console of the optical scan voting tabulator 12 can be similarly accessed through the front of front compartment, even when stowed. With respect to side rail 60A, tie bar 80A runs laterally across the top of front compartment from vertical strut 78A to the end of the side rail 60A, and two spaced tie bars 81A, 82A drop down from cage bar 80A to the platform 42 (similar configuration on side rail 60B). Thus tie bars 80A-82A (as well as opposing tie bars 80B-82B) only partially fill the open aperture to the front compartment in each side rail 60A, 60B, providing said access and yet full lateral restraint to prevent the optical scan voting tabulator 12 from falling out of the cart 2 sidelong, and also obstructs tampering with the device.

Of course, there must be some means for loading the optical scan voting tabulator 12 into the cart 2 (inside the front compartment), and this is afforded by a screw-removable bracket 73 secured side to side between side-rails 60A, 60B approximately one-quarter down from the top thereof. Bracket 73 is a simple tubular or I-beam secured on both ends by screws or bolts into the side-rails 60A, 60B. Removal of the bracket 73 opens the front compartment fully from the end of cart 2 and allows installation/removal of the optical scan voting tabulator 12. Specialty security screws/bolts which require specialty tools for removal are an optional accessory.

Figure 5:
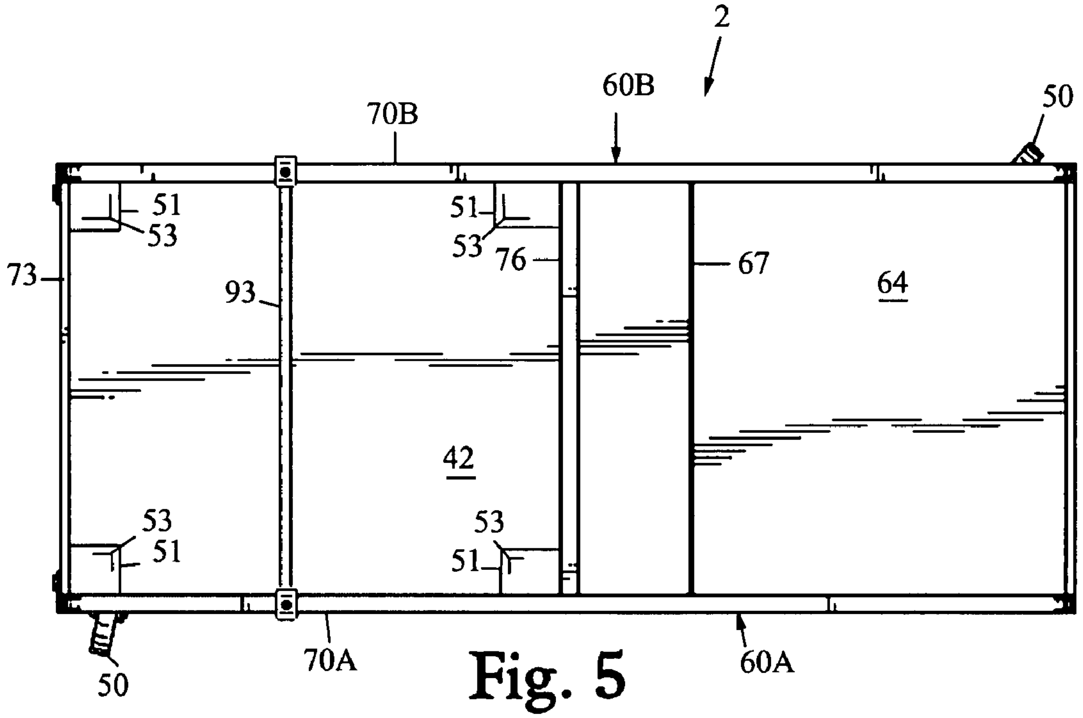
FIG. 5 is a top view of the utility cart 2 as in FIGS. 1-4.
Figure 6:
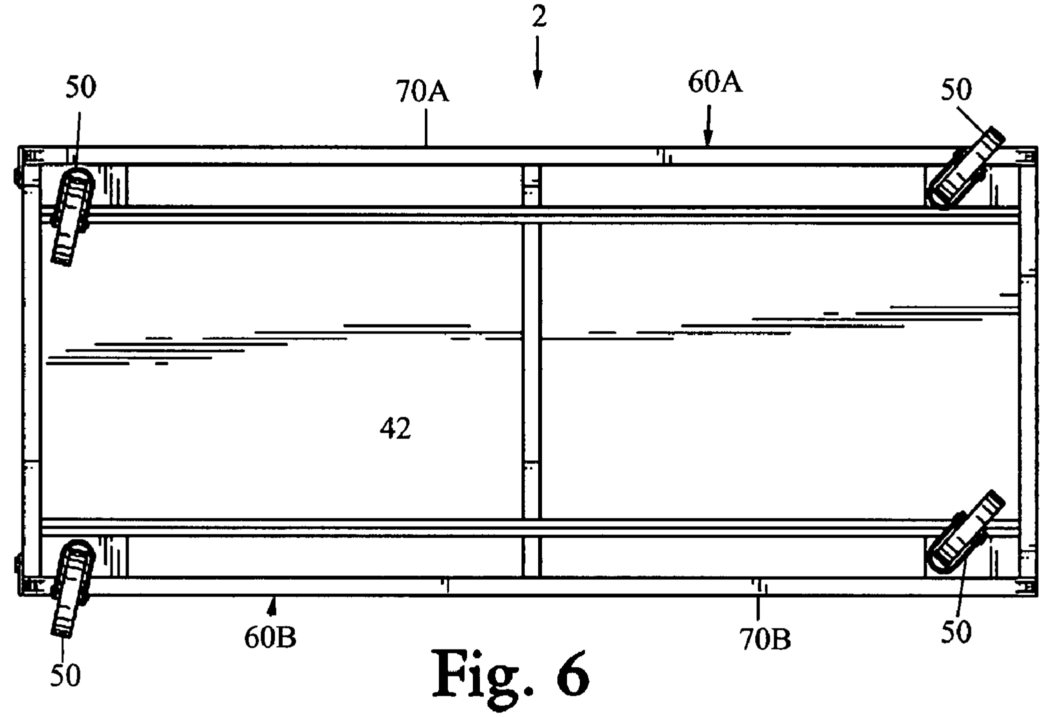
FIG. 6 is a bottom view of the utility cart 2 as in FIGS. 1-5.
Figure 8:
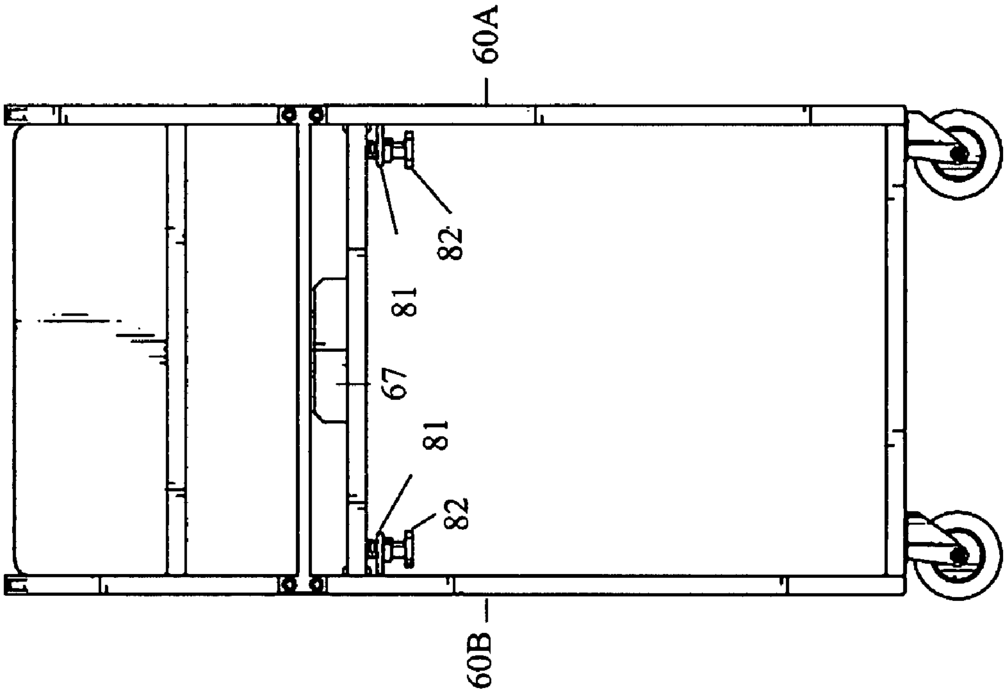
FIGS. 7 and 8 are a left and right end views, respectively, of the utility cart 2 as in FIGS. 1-6.
Figure 7:
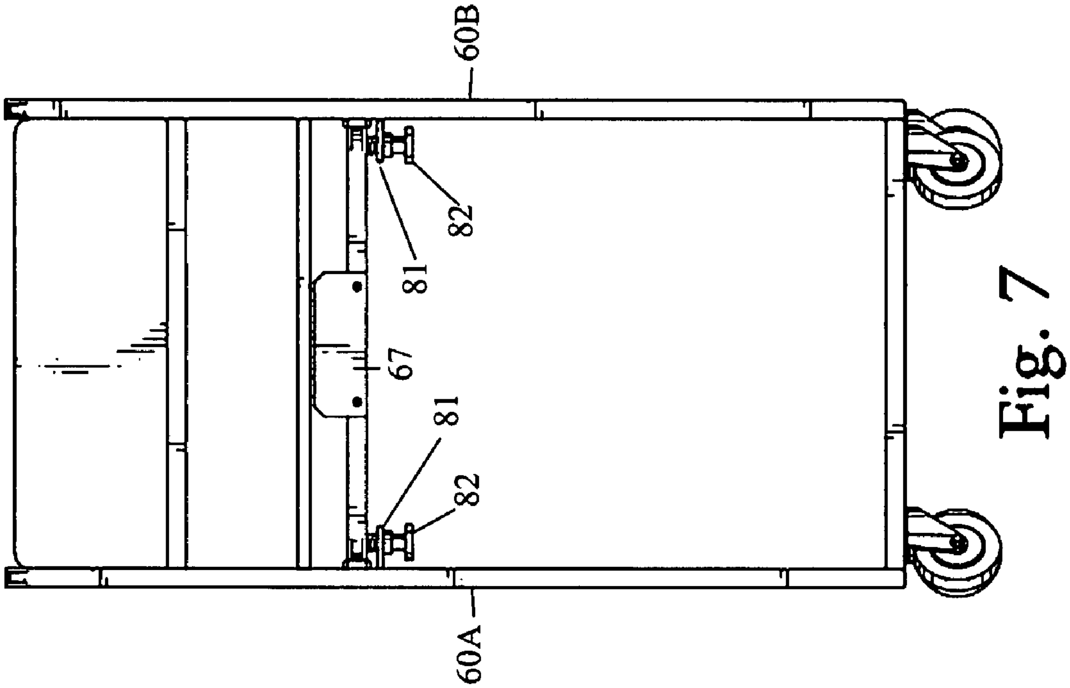

FIG. 5 is a top view of the utility cart 2 as in FIGS. 1-4, FIG. 6 is a bottom view, and FIGS. 7 and 8 are a left and right end view, respectively. Mounting means are provided integral with or attached to the lower platform 42 for the castor wheels 50. This includes four corner-mounted support plates 51 with open sleeves adapted to receive castors 50 which swivel freely therein. All such castors 50 are heavy-duty castors, and brakes or swivel locks are an optional feature.

It is noteworthy that most commercial ballot scanner ballot boxes are supplied with integrated castors. To accommodate and stabilize these, the lateral bottom struts 71A, 71B are equipped with four support plates 51 (overtop platform 42, if included) in the area of the aft compartment, and each support plate 51 includes a restraining chalk 53 formed as an upwardly protruding flange. FIG. 5 illustrates the four restraining chalks 53 each formed by an angled flange mounted appropriately on the support plate 51 and wielding a lip upward to catch the castor seated therein (other angle stops, depressions or openings in the deck will serve the same purpose) to further restrain the movement of the optical scan voting tabulator 12.

An restraint bar 93 is provided as seen in FIGS. 1, 2 and 5, and this spans the side-rails 60A, 60B overtop the rear compartment for vertical stabilization of the voting equipment. The restraint bar 93 may include two downwardly protruding push-stays 94 that bear against the optical scan voting tabulator 12 to secure it, and the underlying ballot box in place. The push stays 94 may fit into indents (lifting recesses) or lugs formed in the optical scan ballot tabulator 12 to restrict both lateral and vertical movement, effectively locking the ballot tabulator in place to keep it from being lifted out of the cart, as well as secure the ballot tabulator and ballot box in the event the cart is accidentally dropped or turned over. Restraint bar 93 may be either welded, or screw-clamped in place (as illustrated) to allow lateral positioning. The top restraint bar provides vertical stabilization and restricts the movement of the optical scan voting tabulator 12 and ballot box on the cart especially during transport.

As seen in FIGS. 7 and 8, a mechanical shelf lock is provided including a flange 81 with threaded through-bore protruding outwardly from the lower portion of the bracket 79A, and a thumb-screw 82 inserted upwardly therein and adjustable against the underside of pull out shelf 20. The mechanical shelf lock serves to maintain the shelf 20 in either an open or closed position to secure the voter assist terminal 14 thereon.

Figure 9:
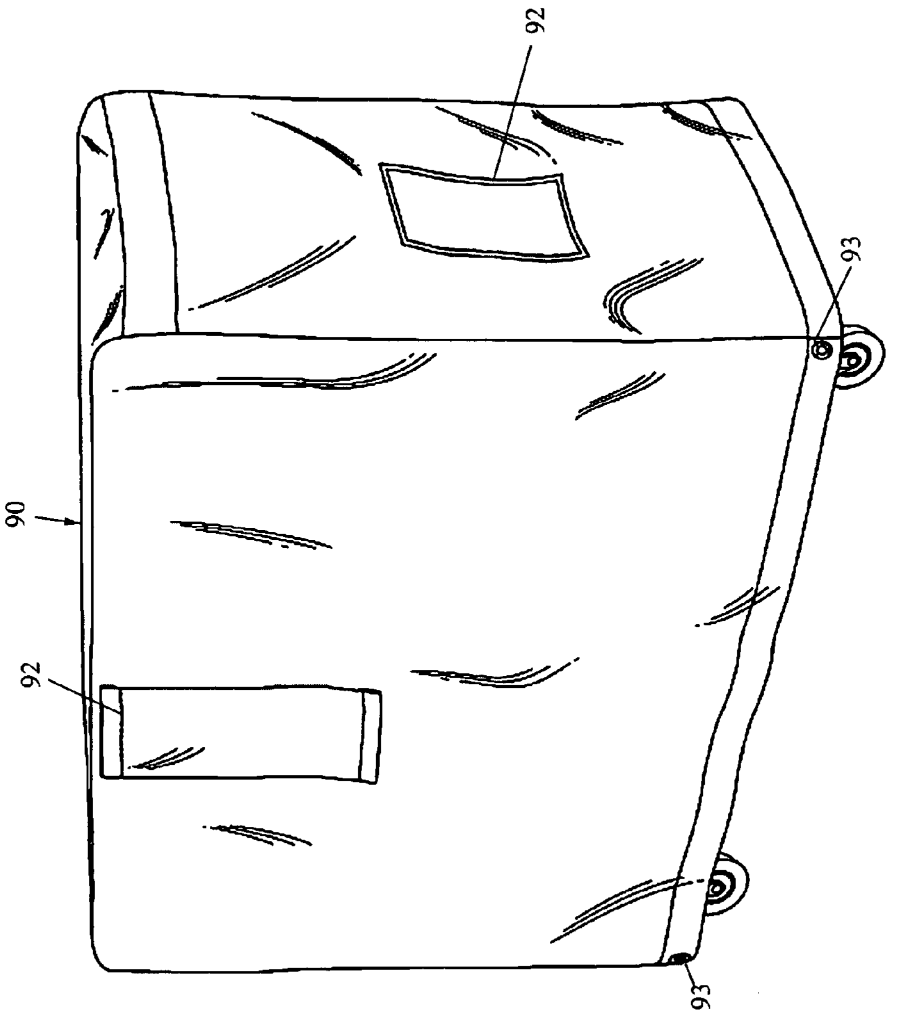
FIG. 9 illustrates an optional cart cover 90 sewn from fabric (Vinyl, Nylon, or other suitable cloth) to conform to the rectangular outer confines of the cart 2.

Finally, FIG. 9 illustrates an optional cart cover 90 sewn from fabric (Vinyl™, Nylon™ or other suitable cloth) to conform to the rectangular outer confines of the cart 2. The cart cover 90 generally protects the equipment stored on the cart 2. Moreover, the cart cover 90 is formed with one or more apertures 92 which provide access for electrical cords, even with the cover 90 applied. These cord access apertures 92 allow electrical "chaining" of the electronics on the cart together during storage for charging the batteries of the internal equipment. Note the reinforced grommets 94 about the bottom which allow the covers to be locked or zip tied, providing an added level of security.

In use, the touch-screen voting terminal is seated atop the sliding shelf 20, the optical scan voting tabulator is installed in compartment 30, and one or more collapsible voting booths may be loaded onto platform 40 beneath the shelf, and miscellaneous (smaller) equipment atop the upper shelf. The equipment can remain on the cart and need never be off-loaded. When it is time to vote, all said equipment may be wheeled into usable positions in the precinct, the voting booths removed and set up, all such equipment plugged into the optional on-board power strip 80 which is in turn plugged in, and the precinct is then ready for voting traffic. The touch-screen voting terminal is deployed face-forward on waist-level slide-out shelf 20 for easy wheelchair and/or any other voter access thereto. Since the equipment is fully accessible while on the cart, it need not be off-loaded for voting. During voting, all equipment is fully restrained against lateral motion, and yet all equipment is given full access to the control panels, doors, etc. Moreover, the particular design maximizes strength and usability, and yet keeps weight to a minimum with a framework that is as light weight as possible. After voting the process is reversed and the cart is removed. Precinct workers are grateful to not have to lift any equipment.

Figure 10:
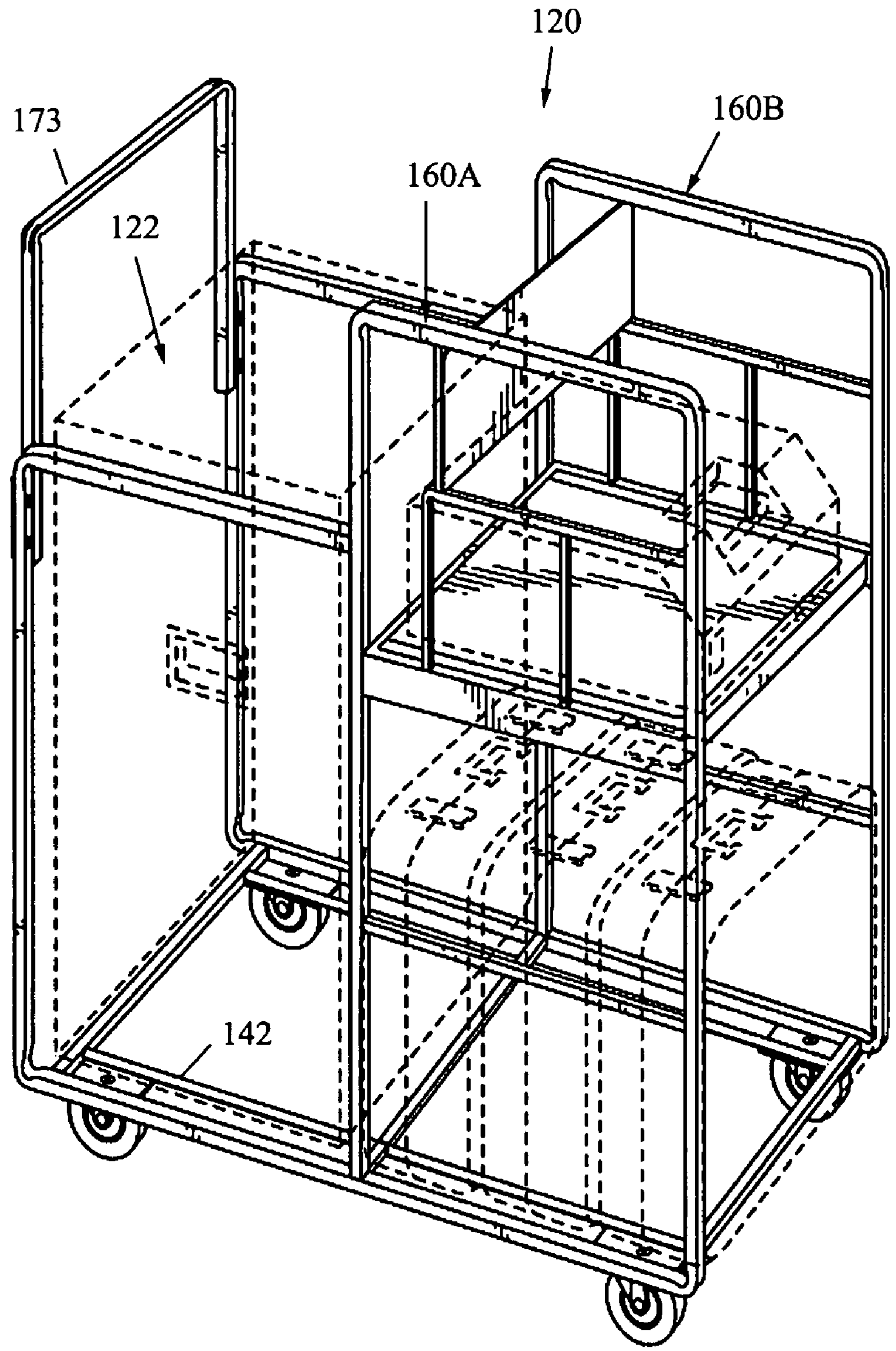
FIG. 10 is a perspective view of a second exemplary embodiment of the utility cart 120 adapted for bearing the same voter assist terminal 14 but a different optical scan voting tabulator 12.

FIG. 10 is a perspective view of another exemplary embodiment of the utility cart 120 adapted for bearing a Diebold AccuVote-OS™ and AutoMARK™ voter assist terminal. This particular model Ballot Counter 122 (shown in dotted lines) also has side access doors as with the M-100, plus an upwardly pivoting feeder much like conventional copier devices. To accommodate this, the cart 120 generally comprises the same substantially rectangular tubular framework on lower platform 142. Platform 142 is not a deck as described above but a rectangular framework. The deck 142 is bounded by opposing side-rail assemblies 160A and 160B. However, note that the side rail assemblies 160 are lower on one side to provide front/rear access to the feeder. In addition, the above-described struts (80, 81, 82) securing the sides of the aft compartment are eliminated, and the screw-removable bracket 73 is replaced by a U-shaped extension bracket 173. The ends of the extension bracket 173 are equipped with sleeves that fit inside the opposing side-rail assemblies 160A and 160B, and are bolted thereto. This elevates the extension bracket 173 up above the Ballot Counter 122 to provide protection and yet allows access when its upwardly pivoting top is raised.

Operation of the voter cart embodiment 120 is in all other respects identical to cart 2. The layout of the cart 120 affords excellent voting privacy since an election official scanning a ballot at one end cannot see the voter's inputs to the voting terminal at the other end of the cart 120.

One skilled in the art should understand that other accessories are possible in addition to those shown, which are illustrative only and are not intended to be self limiting.

Figure 11:
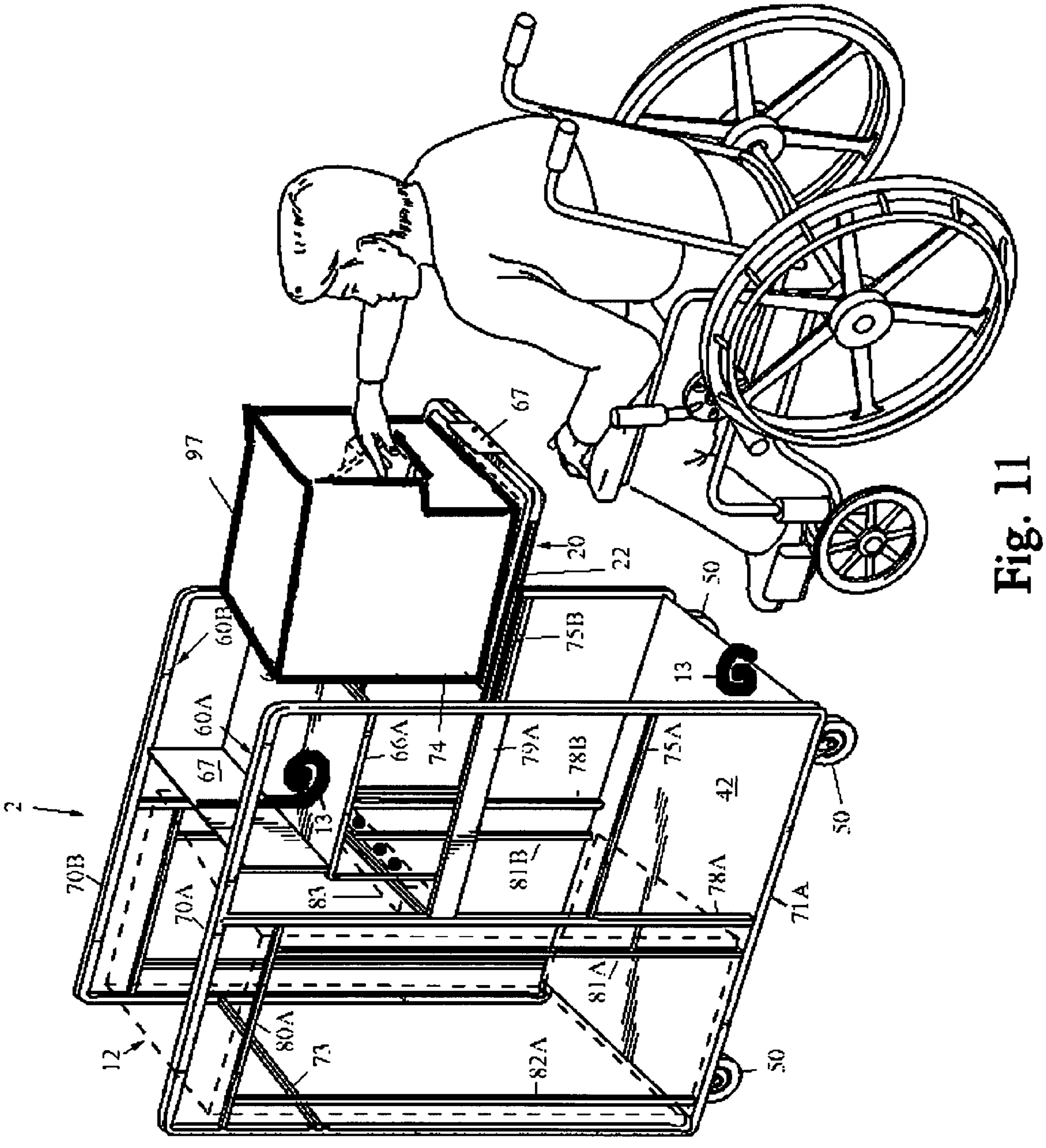
FIG. 11 is a perspective view of an optional privacy screen 97.

For example, to further enhance privacy an optional privacy screen 97 may be employed as shown in FIG. 11. The privacy screen 97 comprises a five-walled enclosure with open viewing aperture directed outwardly toward the voter. The privacy screen is preferably removably attached by Velcro™ or the like directly to the pull-out shelf assembly 20 overtop the voting terminal to shield the voter's actions.

In all such cases the utility carts 2, 120 according to the present invention provide a storage and transport solution especially suited for voting devices including a manual or touch-screen voting terminal, optical scan voting tabulator, collapsible voting booths, as well as other equipment as desired, with robust security and privacy features.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth herein.

We claim:

1. A voter cart for transporting a combination of a voting terminal, optical scan ballot counter and ballot box, and for parking said optical scan ballot counter and voting terminal in an accessible position for a judge's and voter use, respectively, both while still on said cart, comprising:

- a pair of opposing side-rails each defined by at least two vertical struts and at least two lateral struts joined in a substantially rectangular shape;
- a plurality of castors mounted beneath said side-rails;
- a plurality of transverse struts joining said side-rails together and dividing said voter cart into a distinct fore compartment, and aft compartment for containing an optical scan ballot counter and ballot box;
- a fixed shelf assembly subdividing said fore compartment and providing a support surface;
- an extensible shelf assembly mounted on roller brackets beneath said fixed shelf assembly and further subdividing said fore compartment, said extensible shelf assembly providing support for said voting terminal;
- said extensible shelf assembly leaving space there beneath and in said fore compartment for storing a plurality of portable voting booths and other precinct equipment.

2. The voter cart according to claim 1, further comprising a plurality of tie bars spanning the vertical and lateral struts of the opposing side-rails for further reinforcement.

3. The voter cart according to claim 1, further comprising restraint bar spanning the side-rails overtop the aft compartment for vertical stabilization of the optical scan ballot counter and ballot box.

4. The voter cart according to claim 3, wherein said restraint bar is slidably attached across the side-rails for lateral positioning further reinforcement. The voter cart according to claim 3, wherein said restraint bar further comprises a pair of downwardly protruding push-stays that bear against the optical scan voting counter.

5. The voter cart according to claim 1, further comprising a first securement belt attachable vertically across said extensible shelf for securing said voting terminal in said cart.

6. The voter cart according to claim 5, further comprising a second securement belt attachable horizontally across said fore compartment for restraining said plurality of portable voting booths.

7. The voter cart according to claim 1, further comprising a compression screw selectively bearing against said extensible shelf assembly for fixing its position.

8. The voter cart according to claim 1, further comprising a power strip mounted on one of said transverse struts.

9. The voter cart according to claim 1, wherein, said side-rail assemblies are each configured in a laid-over figure-eight.

10. The voter cart according to claim 1, wherein said side-rails are joined at the bottom by a platform including a plurality of restraining chalks for restraining said ballot counter in the aft compartment.

11. The voter cart according to claim 1, further comprising a fabric cover for covering all voting equipment resident in said cart.

12. A utility cart for transporting voting devices at least inclusive of a touch-screen voting terminal, ballot counter, and ballot box, comprising:

- a pair of opposing side-rails formed with tubing and including a front, top, back and bottom rail joined substantially in a rectangle;
- a plurality of lateral struts joining said pair of opposing side-rails together, including at least two lateral struts spanning the bottom rails;
- a plurality of castors mounted beneath said at least two bottom struts;
- an extensible shelf mounted on roller-brackets between said side-rails and extensible from one end thereof;
- a plurality of tie bars interrupting the rectangle of said side rails; and
- a securement belt attachable across said extensible shelf for securing said touch-screen terminal in said cart; and
- a fixed shelf assembly subdividing said fore compartment and providing a support surface.

13. The voter cart according to claim 12, further comprising a plurality of tie bars spanning the struts of the opposing side-rails for further reinforcement.

14. The voter cart according to claim 12, further comprising a first securement belt attachable vertically across said extensible shelf for securing said voting terminal in said cart.

15. The voter cart according to claim 14, further comprising a second securement belt attachable horizontally across said fore compartment for restraining said plurality of portable voting booths.

16. The voter cart according to claim 12, further comprising a set screw selectively bearing against said slide out shelf for fixing its position.

17. The voter cart according to claim 12, further comprising a power strip mounted on one of said transverse struts.

18. The voter cart according to claim 12, wherein said side-rail assemblies are each configured in a laid-over figure-eight.

19. The voter cart according to claim 12, further comprising a bottom platform spanning the side-rails at the bottom, said platform including a plurality of restraining chalks for restraining said ballot counter in the aft compartment.

20. The voter cart according to claim 12, further comprising a fabric cover for covering all voting equipment resident in said cart.

* * * * *